United States Patent [19]
Michioka et al.

[11] Patent Number: 6,012,848
[45] Date of Patent: Jan. 11, 2000

[54] ENDLESS SLIDING GUIDE APPARATUS

[75] Inventors: Hidekazu Michioka; Hiroshi Takamatsu; Mitsuaki Honma, all of Tokyo, Japan

[73] Assignee: THK Co., Ltd., Tokyo, Japan

[21] Appl. No.: 09/066,946

[22] Filed: Apr. 28, 1998

[30]  Foreign Application Priority Data

Apr. 30, 1997 [JP] Japan .................................. 9-112895

[51] Int. Cl.⁷ .......................... F16C 29/06; F16C 29/04; F16C 19/00
[52] U.S. Cl. .................. 384/43; 384/49; 384/50
[58] Field of Search ................. 384/43, 44, 49, 384/50

[56]  References Cited

U.S. PATENT DOCUMENTS

| | | | |
|---|---|---|---|
| 4,674,893 | 6/1987 | Teramachi | 384/43 X |
| 4,832,508 | 5/1989 | Teramachi | 384/43 X |
| 5,558,448 | 9/1996 | Yabe et al. | 384/470 |
| 5,807,920 | 9/1998 | Ueno et al. | 384/527 X |
| 5,857,779 | 1/1999 | Tsukada et al. | 384/45 X |

FOREIGN PATENT DOCUMENTS 7-317762  12/1995  Japan .

*Primary Examiner*—Thomas R. Hannon
*Assistant Examiner*—Brandon C. Stallman
*Attorney, Agent, or Firm*—Nikaido Marmelstein Murray & Oram LLP.

[57]  ABSTRACT

An endless sliding guide apparatus including a track rail, a sliding table having an endless track comprising a load rolling path, a no-load rolling path and a change direction path and rolling bodies wherein at least one of the no-load rolling path, the inner peripheral portion of the change direction path and a rolling body retaining section of the load rolling path is formed by synthetic resin rolling body guide members formed by insert molding using a bearing race as a core. The rolling body guide members are molded by a synthetic resin composition satisfying the relational expression of $(a \times b) \div c \geq 700$ Mpa with respect to the tensile strength a (MPa), tensile elongation b (%) and shrinkage c (%). The endless sliding guide apparatus of the present invention has the advantages that since the endless track of the sliding table is accurately formed, the rolling of the rolling bodies along the endless track is quite smooth, the noise level is minimized and not only the manufacture of the sliding table can be automated but also the problem of "corner cracks" in the synthetic resin rolling body guide members can be eliminated thereby extending the working life of the apparatus.

4 Claims, 6 Drawing Sheets

ENDLESS SLIDING GUIDE APPARATUS

FIELD OF THE INVENTION AND RELATED ART STATEMENT

The present invention relates to an endless sliding guide apparatus such as a rectilinear guide apparatus, a curvilinear guide apparatus, a revolving bearing or the like and more particularly to such type of endless sliding guide apparatus that comprises a track rail, a sliding plate movable along the track rail, a sliding table and rolling bodies rolling between the track rail and the sliding table while bearing a load wherein at least one of a no-load rolling path, an inner peripheral portion of a change direction path and a rolling body retaining portion of a load rolling path of the sliding table is formed by synthetic resin rolling body guide members formed by insert molding using a bearing race as a core.

In the cases of various kinds of endless sliding guide apparatuses each provided with a bearing, the linear motion or rotary motion of rolling bodies such as balls or rollers between a track rail and a sliding table is made possible by making use of the rolling motion of the rolling bodies and in order to (1) prevent the falling off of the rolling bodies at the time when the sliding table is separated from the track rail, (2) to reduce the frictional resistance by preventing the rolling bodies from coming into contact with one another and (3) to cause the rolling bodies to move smoothly by forming them in line at a predetermined position, it is being practiced to incorporate a number of such rolling bodies between the track rail and the sliding table by using a metallic thin plate or synthetic resin retainer or cage.

However, in a method using the retainer, it is necessary to form an endless track for the rolling bodies by assembling the retainer into the sliding table so as to incorporate the rolling bodies in the endless track but there are such problems that it requires a skill for assembling the retainer and it is difficult to automate the assembly. Further, in a method using the cage, since the cage is assembled in the sliding table while a number of rolling bodies are rotatably retained in the cage, although the rolling bodies can be easily incorporated into the sliding table, there arises another problem that it becomes necessary to incorporate the number of rolling bodies in each of pockets of the cage in advance so that much labor and cost are required to manufacture the cage having a number of rolling bodies incorporated therein.

In order to solve these problems, the present inventors proposed an endless sliding guide apparatus in which a sliding table having an endless track for rolling bodies comprising a load rolling path, a no-load rolling path and a change direction path is formed by a bearing race having at least a load rolling path, synthetic resin rolling body guide members formed by insert molding using the bearing race as a core and each having at least one of a no load rolling path, an inner peripheral portion of a change direction path and a rolling body retaining portion of a load rolling path and a pair of synthetic resin covers respectively attached to both front and rear ends of the bearing race having the rolling body guide members and each having an outer peripheral portion on the inner surface thereof which forms a change direction path side by side with the above-mentioned inner peripheral surface.

In the case of the above endless sliding guide apparatus, since a part or most of the endless track of the sliding table is formed by the synthetic resin rolling body guide members formed by insert molding using a bearing race as a core, the apparatus has the advantages that the endless track can be accurately formed, rolling of the rolling bodies within the endless track becomes extremely smooth, the sliding of the sliding table along the track rail becomes smooth, the noise level can be minimized and the manufacture of the sliding table having the rolling bodies incorporated therein is facilitated for automation.

However, where a sliding table of an endless sliding guide apparatus is manufactured by this method, there is sometimes a case in which rolling body guide members formed by insert molding using a bearing race as a core, especially a portion covering the corners thereof, tends to crack (hereinafter referred to as the "corner crack") which sometimes results in producing a defective product or shortening the life of the product.

Therefore, as a result of investigation of the cause of generation of such corner crack, the present inventors have found out that when the rolling body guide members are formed by insert molding using a bearing race as a core, a stress inevitably concentrates on the portion covering each of the corners of the bearing race in the course of cooling the resin material so that during that cooling process or thereafter, that portion tends to crack.

That is, where the bearing race as a core is arranged within a mold and a molten resin material is injected into the mold to thereby form rolling body guide members by insert molding, if a thick portion of the resin material is present near each of the corners of the bearing race, this problem of cracking becomes outstanding. This is because of the fact that the molten resin material at the portion covering each of the corners of the bearing race first becomes solidified and then, when the thick portion of the resin material near each of the corners is cooled to solidify, the molten resin solidifies from its surface contacting the metallic surface of the bearing race or mold to the interior thereof with the generation of a so called "sink" so that the initially solidified portion of the resin covering each of the corners of the bearing race is stretched to cause an excessive stress to be applied on that portion resulting in the generation of a crack at the corner.

As means for solving such problem, there are considered several methods in which the thickness of the resin is made uniform to allow the entire resin to be cooled at a constant speed, the resin is slowly cooled within the mold while keeping a dwelling time (that is, keeping a long in-mold cooling time) or the cooling speed is delayed. However, even when the thickness of the resin is made uniform, the problem of the corner crack can not be completely overcome and further, the extension of the in-mold cooling time or the delaying of the cooling speed results in sharply reducing the productivity so that any of these methods can not be said to be a satisfactory solution to the problem.

OBJECT AND SUMMARY OF THE INVENTION

Therefore, as a result of their assiduous investigations of means of solving the above-described problem, the present inventors have found that the above-described problem of the corner crack can be solved by molding the rolling body guide members with a specific molding material especially when the rolling body guide members are formed by insert molding using a bearing race as a core.

Accordingly, an object of the present invention is to provide an endless sliding guide apparatus which is free of the problem of "scorner cracks", and which has a long working life. The guide apparatus according to the present invention has various advantages that since the apparatus is provided with the synthetic resin rolling body guide members which are formed by insert molding using a bearing race as a core and which form part or the most of the endless track of the sliding table, the endless track is formed accurate to allow the rolling bodies to roll quite smoothly, the noise level is reduced and the workability in the manufacture of the sliding table having rolling bodies incorporated therein is improved to enable the manufacture of the sliding table to be automated.

That is, the endless sliding guide apparatus according to the present invention comprises a track rail, a sliding table movable along the track rail and a plurality of rolling bodies rolling between the track rail and the sliding table while bearing a load wherein the sliding table comprises a bearing race having an endless track including a loaded rolling path, a no-load rolling path and a change direction path and at least a load rolling surface, synthetic resin rolling body guide members formed by insert molding using the bearing race as a core and having at least one of a no-load rolling path, an inner peripheral portion of a change direction path and a rolling body retaining section of a load rolling path and a pair of synthetic resin covers respectively attached to the front and rear ends of the bearing race and each having on the inner surface thereof an outer peripheral portion for forming a change direction path side by side with the above-mentioned inner peripheral portion wherein the rolling body guide members are molded by using a material satisfying the relational expression of $(a \times b) \div c \geqq 700$ Mpa.

In the present invention, the material for molding the rolling body guide members is required to satisfy the relational expression of $(a \times b) \div c \geqq 700$ Mpa or preferably that of $(a \times b) \div c \geqq 800$ Mpa with respect to the molding shrinkage c (%) obtained by using a test piece of 120 mm×120 mm×2 mm molded under the standard molding conditions (Injection molding pressure: 500 kgf/cm$^2$, Cylinder temperature: 240° C., Mold temperature: 70° C., Injection speed: 3.5 m/min, Cycle: Dwelling for 25 sec and Cooling for 10 sec and Gate: 4 W 2t). If the value of $\{(a \times b) \div c\}$ is lower than 700 Mpa, when the rolling body guide members are formed by insert molding using the bearing race as a core, or after the formation thereof, a corner crack tends to generate so that it is not possible to extend the working life of the product.

As molding materials satisfying the above-described requirements, we can basically enumerate various kinds of thermoplastic resin compositions consisting of thermoplastic resins such as polyolefine, ABS, nylon, polybutylene terephthalate, polyacetal, denatured polyphenylene oxide, polyphenylene sulfide and the like mixed in various ratios with a variety of kinds of mineral fibers (as fillers) such as glass fiber, rock wool fiber, carbon fiber, titanic acid potassium whisker and the like. Further, to these resin compositions, additives such as a coloring agent like a pigment, a heat stabilizer, a flame retardant, an anti-static agent and the like are added.

Due to the fact that the rolling body guide members have a comparatively complicated shape and are exposed to comparatively severe conditions and in consideration of the moldability, heat-resistant property, slidability and Young's modulus of the molding materials, it is preferable to use among the above-described thermoplastic resin compositions, nylon, polybutylene terephthalate and polypropylene as thermoplastic resins and to use titanic acid potassium whisker, carbon fiber and glass fiber as fillers and especially from the point of view of moldability, the use of those having a melt index (MI) of higher than 15, preferably higher than 25, is more preferable. Further, the most desirable one of the thermoplastic resin compositions is a composition having a melt index of 15~35 obtained by mixing 2~5% by weight of titanic acid potassium whisker in polybutylene terephthalate. By using this thermoplastic resin composition as a molding material for the rolling body guide members, it is not only possible to prevent the generation of a crack at each of the corners of the rolling body guide members of the sliding table of the endless sliding guide apparatus thus produced but also to sharply improve the working life of the product.

Further, in the present invention, each of the rolling body guide members integrally formed over a bearing race using a molding material may well include at least one of a no load rolling path, the inner peripheral surface of a change direction path and a rolling body retaining section of a load rolling path but it is preferable to include all of them whereby the entire endless track for the rolling bodies can be accurately formed.

As endless sliding guide apparatuses to which the present invention can be applied, there are a rectilinear sliding guide apparatus having a sliding table capable of making linear reciprocating motions on a track rail while bearing a load, an endless sliding curvilinear guide apparatus having a sliding table capable of making curvilinear reciprocating motions on a curvilinear track rail of a predetermined radius of curvature and a swing bearing having a block-shaped or circular sliding table capable of swinging along a circular track rail and as rolling members rolling between the track rail and the sliding table, balls or rollers may be used.

As described above, in the case of the endless sliding guide apparatus according to the present invention, since the rolling body guide members formed by insert molding using a bearing race is made of a molding material satisfying the relational expression of $(a \times b) \div c \geqq 700$ Mpa, a part or most of the endless track of the sliding table is accurately formed so that the rolling of the rolling bodies becomes quite smooth, the noise level is lowered and the workability in the manufacture of the sliding table having rolling bodies incorporated therein is improved to enable the manufacture to be automated. Further, the problem of "corner cracks" on the rolling body guide members can be eliminated while keeping the above-described advantages as they are so that the number of defective products can be minimized and the working life of the product can be sharply improved.

DETAILED DESCRIPTION OF THE PREFERRED EMBODIMENTS

The best mode for carrying out the present invention will now described with reference to preferred embodiments of the invention shown in the accompanying drawings.

Embodiment 1

Figure 1:
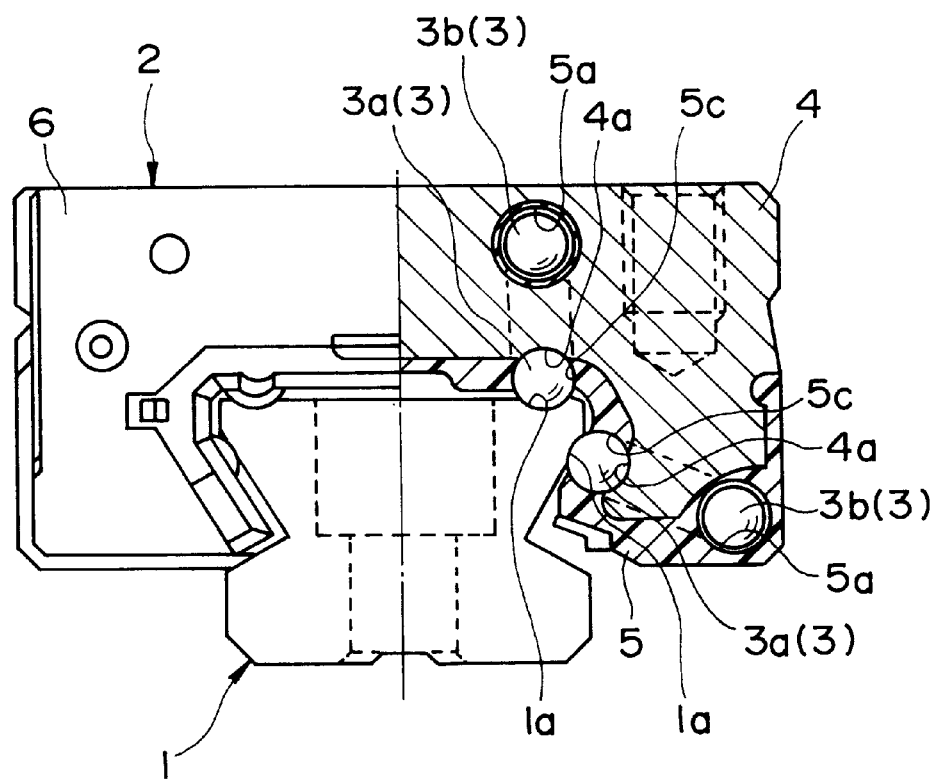
FIG. 1 is a front view (partly in section) of an endless sliding rectilinear guide apparatus according to one embodiment of the present invention.
Figure 2:
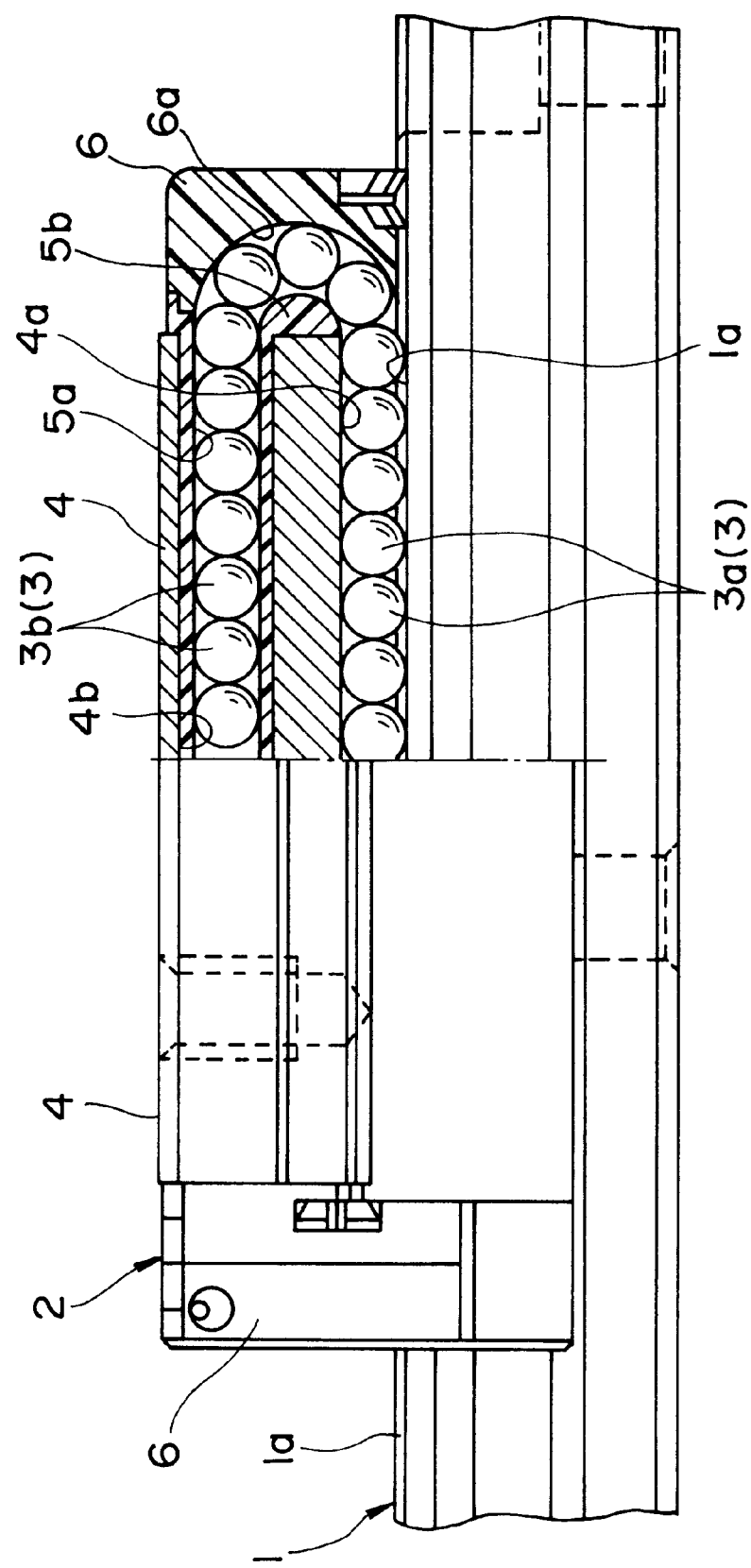
FIG. 2 is a side view (partly in section) of the rectilinear guide apparatus shown in FIG. 1.
Figure 3:
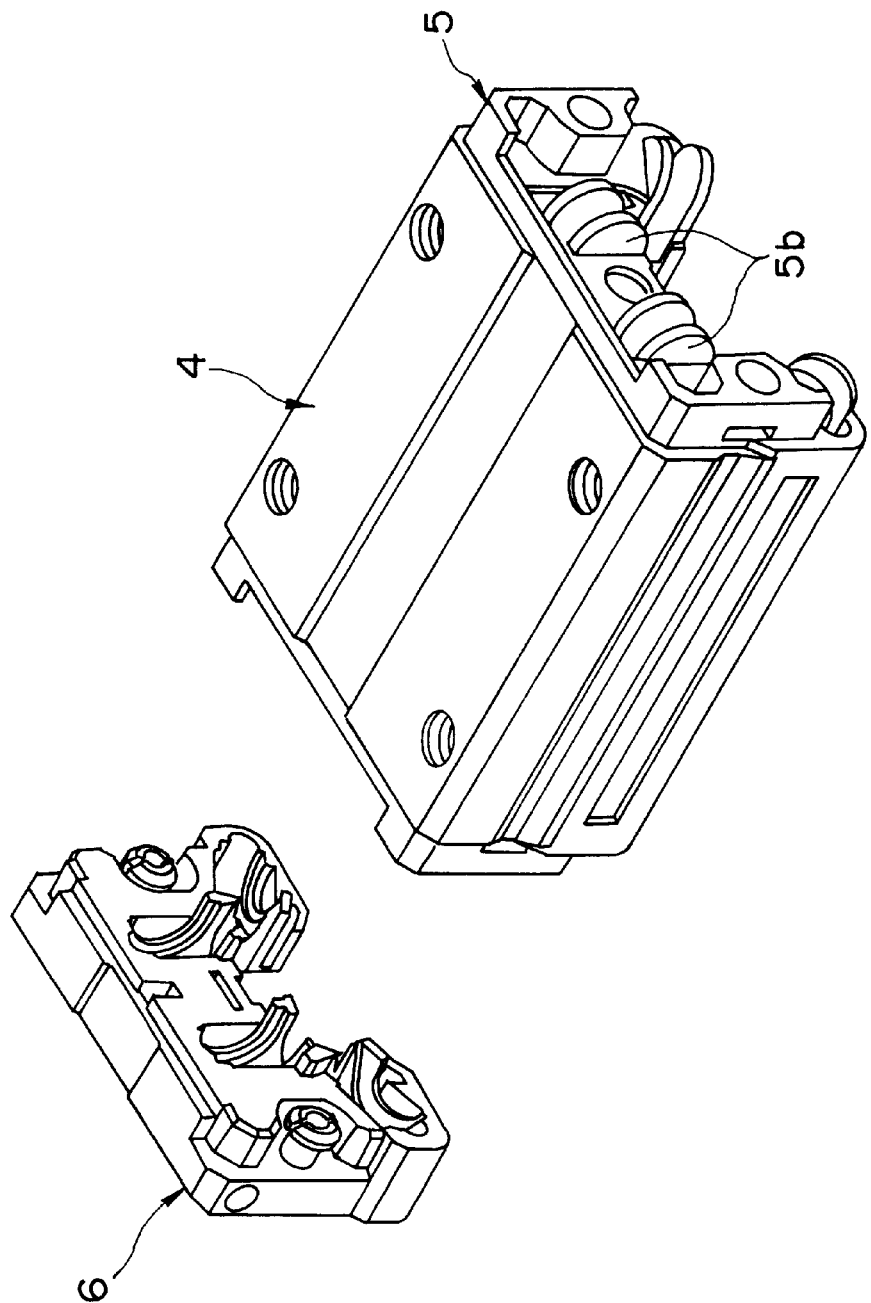
FIG. 3 is a perspective view showing a bearing races rolling body guide members and one of covers integrally forming a sliding table of the endless sliding rectilinear guide apparatus shown in FIG. 1.

In FIGS. 1 and 2, there is shown an endless sliding rectilinear guide apparatus according to a first embodiment of the present invention. This rectilinear guide apparatus basically comprises a track rail 1, a slide table 2 movable along the track rail 1 and balls 3a rolling between the track rail 1 and the slide table 2 as they bear a load.

The track rail 1 is provided with a circular arc-shaped ball rolling groove 1a in which a ball 3a rolling between the track rail 1 and the slide table 2 as it bears a load. Further, the slide table 2 comprises a bearing race 4 having a circular arc-shaped loaded ball groove (loaded rolling surface) 4a which is opposed to the ball rolling groove 1a of the track rail 1 and on which the loaded ball 3a rolls, synthetic resin ball guide members (rolling body guide members) 5 formed by insert molding with the bearing race 4 serving as a core and a pair of synthetic resin covers 6 attached to the front and rear ends of the bearing race 4, respectively.

Further, each of the ball guide members 5 includes an escape ball hole (unloaded rolling path) 5a formed along the inner peripheral wall of a through hole 4b for an unloaded ball 3b provided in the bearing race 4 at the time of molding, a substantially semi-circular inner peripheral portion 5b forming a change direction path for changing the rolling direction of the unloaded ball 3b from a loaded area to an unloaded area or vise versa; ball retaining sections 5c formed on both sides of the loaded ball groove 4a of the bearing race 4 and adapted to prevent the loaded ball 3a rolling on the loaded ball groove 4a from slipping out when the track rail 1 is pulled out of the slide table 2. Further, each of the covers 6 has, on the side of the inner surface thereof a substantially semi-circular outer peripheral portion 6a for forming a change direction path for the unloaded ball 3b together with the inner peripheral portion 5b of the ball guide member 5 whereby an endless track for the balls 3 is formed by the no-load rolling paths formed by the escape ball hole 5a, the change direction paths formed by the inner peripheral portions 5b of the ball guide members 5 and the outer peripheral portions 6a of the covers 6 and the load rolling paths formed by the ball retaining portions 5c of the ball guide members 5.

In this embodiment 1, each of the ball guide members 5 is obtained by molding a thermosetting resin composition consisting of polybutylene terephthalate (PBT) mixed with 3.5% by weight of titanic acid potassium whisker (product name: TISMO by Ohtsuka Chemical Co., Ltd) and having the physical property shown in Table 1 in the following method.

Figure 4:
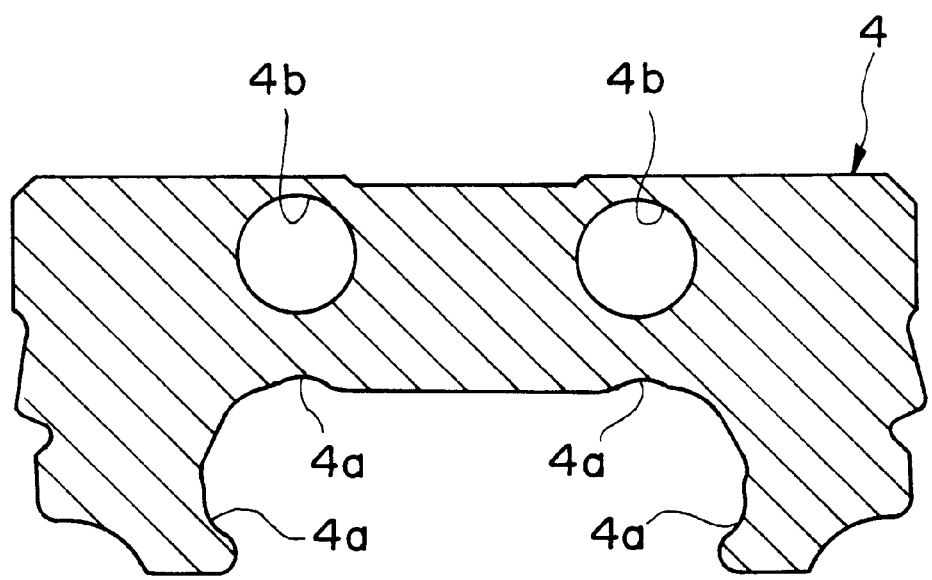
FIG. 4 is a sectional view of a bearing race shown in FIG. 2.
Figure 5:
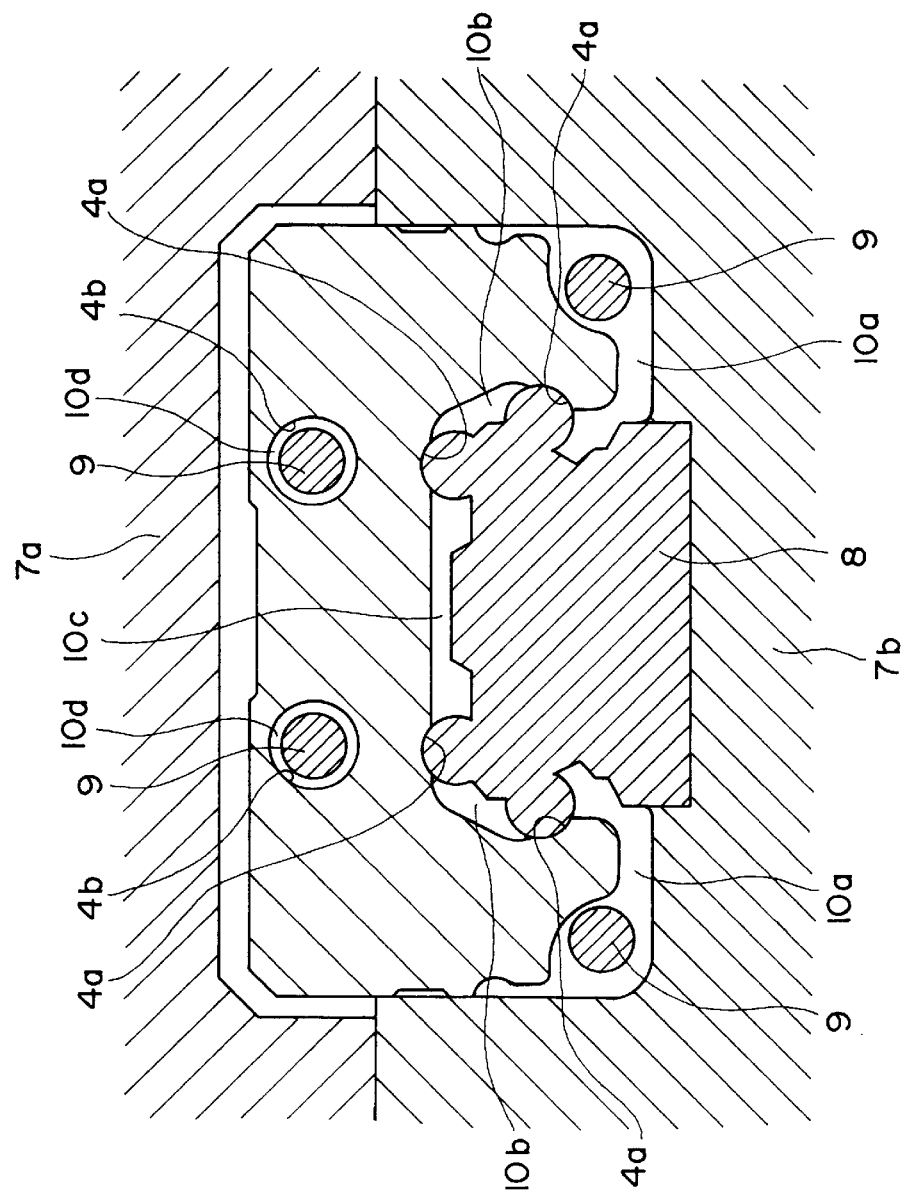
FIG. 5 is a sectional view of the bearing race shown in FIG. 4 especially when it is disposed within a mold.
Figure 6:
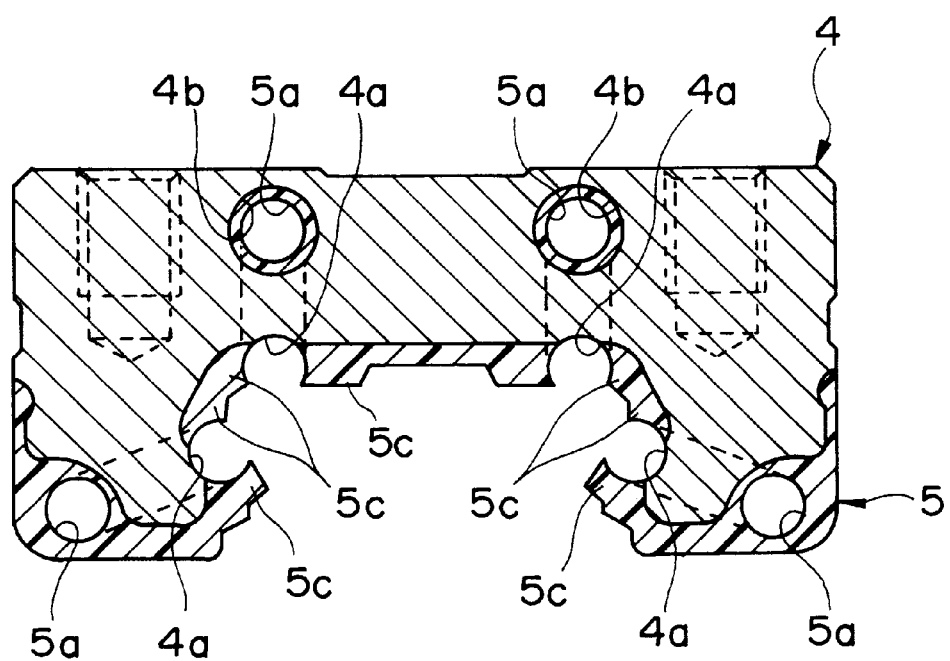
FIG. 6 is a sectional view of ball retaining members provided in the bearing race by the mold shown in FIG. 5.

First, as shown in FIG. 4, a bearing race 4 having four lines of loaded ball grooves 4a and two lines of through holes 4b for an unloaded ball 3b was formed with a steel material. Next, as shown in FIG. 5, the bearing race 4 was supported by a support 8 within a cavity formed by a pair of dies 7a and 7b and four pieces of rod-shaped members 9 for forming escape ball holes 5a were arranged at predetermined positions, respectively, thereby form gaps 10a, 10b, 10c and 10d and a melt of the above-mentioned thermoplastic resin composition was injected under predetermined conditions so that as shown in FIG. 6, the synthetic resin ball guide members 5 were integrally formed with the predetermined portions of the bearing race 4.

The injection molding of the ball guide members 5 was performed by using a screw inline injection molding machine under the conditions of: Molten resin temperature of 240° C., Injection pressure of 400~700 kgf/cm$^2$, Mold temperature of 40~80° C. and Injection speed of 2.5~6.0 m/min.

Further, a thermal shock test was conducted on the ball guide members 5 formed in the embodiment 1 by using a thermal shock testing machine made by the Satake Chemical Machine Industry Co., Ltd. In which the test sample was exposed to low/high temperatures of −20° C.~+60° C. for one hour with the inclusion of a 10 minute temperature elevating time and a 10 minute temperature lowering time. In addition, a high temperature soaking test was conducted on the test sample by using a hot air circulating constant temperature drying machine made by the Satake Chemical Machine Industry Co., Ltd. at a controlled temperature of 100±2° C. The results of these tests were evaluated according to the following four stage levels as shown in the table 1.

⊚: No corner cracks and other minute cracks were observed.

○: No corner crack and no minute crack were observed but a minute size change was observed.

Δ: White spots were observed on the surface of the sample but no breakage or crack was observed.

×: Defects such as corner cracks and minute cracks were observed.

Embodiment 2

A thermoplastic resin composition mixed with 3.0% by weight of titanic acid potassium whisker and having the physical property shown in the table 1 was molded to provide ball guide members of a sliding table in the same manner as in the case of the embodiment 1 and the molded product was evaluated by subjecting it to a thermal shock test and a high temperature soaking test with the results shown in the table 1.

|  |  | Embodiments | |
|---|---|---|---|
|  |  | 1 | 2 |
| Physical property of resin composition | Tensile strength (Mpa) | 63 | 60 |
|  | Tensile elongation b (%) | 49 | 16 |
|  | Molding shrinkage c (%) | 1.5 | 1.3 |
|  | (a × b) ÷ c | 2058 | 738 |
|  | MI | 18 | 30 |
| Thermal shock test evaluation |  | ⊚ | ○ |
| High temperature soaking test |  | ⊚ | ○ |

From the results shown in the table 1, it was found that when the ball guide members were manufactured by using a thermoplastic resin composition having the value of the relational expression of (a×b)÷c obtained on the bases of the tensile strength a, the tensile elongation b and the molding shrinkage c being higher than 700 Mpa, it was possible to obtain a product having practically no problem with respect to its performance and working life relating to the generation of corner cracks and other minute cracks.

What is claimed is:

1. An endless sliding guide apparatus comprising a track rail, a sliding table movable along the track rail and a plurality of rolling bodies rolling between the track rail and the sliding table while bearing a load, said sliding table being provided with an endless track comprising a load rolling path, a no-load rolling path and a change direction path, a bearing race having at least a load rolling path, synthetic resin rolling body guide members formed by insert molding using said bearing race as a core and each having at least one of a no-load rolling path, an inner peripheral portion of a change direction path and a rolling body retaining portion of a load rolling path and a pair of synthetic resin covers attached to both front and rear ends of said bearing race and each having an outer peripheral portion on an inner surface thereof so as to form the change direction path side by side with said inner peripheral portion of each of said rolling body guide members, wherein said rolling body guide members are molded by using a material satisfying the relational expression of $(a \times b) \div c \geqq 700$ Mpa with respect to the tensile strength a (Mpa), tensile elongation b (%) and molding shrinkage c (%).

2. The endless sliding guide apparatus according to claim 1, wherein each of said rolling body guide members includes said no-load rolling path, said inner peripheral portion of said change direction path and said rolling body retaining portion of said load rolling path.

3. The endless sliding guide apparatus according to claim 1 or 2, wherein the material for molding said rolling body guide members is a thermoplastic resin composition having a melt index of higher than 15 and consisting of one or more than two kinds of thermoplastic resins selected from polybutylene terephthalate, polyacrylonitrile, polybutadiene styrene and polycarbonate with the addition of an inorganic fiber filler material.

4. The endless sliding guide apparatus according to claim 3, wherein the material for forming said rolling body guide members consists of a thermoplastic resin composition having a melt index of 15~35 obtained by adding 2~5% by weight of titanic acid potassium whisker to polybutylene terephthalate.

* * * * *